(12) United States Patent
Skropolithas

(10) Patent No.: US 11,173,515 B2
(45) Date of Patent: Nov. 16, 2021

(54) STENCIL HOLDER

(71) Applicant: Anna Skropolithas, Stouffville (CA)

(72) Inventor: Anna Skropolithas, Stouffville (CA)

( * ) Notice: Subject to any disclaimer, the term of this patent is extended or adjusted under 35 U.S.C. 154(b) by 2 days.

(21) Appl. No.: 16/855,960

(22) Filed: Apr. 22, 2020

(65) Prior Publication Data

US 2021/0008590 A1 Jan. 14, 2021

Related U.S. Application Data

(60) Provisional application No. 62/872,191, filed on Jul. 9, 2019.

(51) Int. Cl.
| | |
|---|---|
| *B41F 15/36* | (2006.01) |
| *B05C 17/08* | (2006.01) |
| *B05C 21/00* | (2006.01) |
| *B43L 13/20* | (2006.01) |
| *B41L 13/14* | (2006.01) |
| *B41L 13/02* | (2006.01) |

(52) U.S. Cl.
CPC ............ *B05C 17/08* (2013.01); *B05C 21/005* (2013.01); *B41L 13/02* (2013.01); *B41L 13/14* (2013.01); *B43L 13/208* (2013.01)

(58) Field of Classification Search
CPC ......... B44D 2/007; B05C 17/06; B05C 17/08; B05C 9/025
USPC ....................................................... 434/87
See application file for complete search history.

(56) References Cited

U.S. PATENT DOCUMENTS

| | | | | |
|---|---|---|---|---|
| 1,274,864 | A | | 8/1918 | Evans |
| 1,627,630 | A | * | 5/1927 | Carter ............... A21C 15/002 101/114 |
| 1,781,209 | A | * | 11/1930 | Barbera ............. A21C 15/002 101/126 |
| 3,537,406 | A | * | 11/1970 | Lewis ............... B41F 15/0895 426/26 |
| 4,972,598 | A | | 11/1990 | Charters |
| D356,822 | S | | 3/1995 | Volk |
| 6,242,026 | B1 | | 6/2001 | Feeley |
| 6,829,990 | B2 | | 12/2004 | Cochran |
| D643,688 | S | | 8/2011 | Lion |
| 8,458,918 | B2 | | 6/2013 | Ostberg |

(Continued)

FOREIGN PATENT DOCUMENTS

DE 4226502 A1 2/1994

*Primary Examiner* — Leslie J Evanisko
(74) *Attorney, Agent, or Firm* — Argus Intellectual Enterprise; Jordan Sworen; Daniel Enea

(57) ABSTRACT

A stencil holder for rapidly and consistently decorating objects placed therein. The stencil holder includes a base pivotally connected to a frame, wherein the frame can move between an open and closed position. The frame includes a lower support that can removably couple with an upper support, wherein the upper support and the lower support cooperatively secure a stencil therebetween in an operational position. The upper support and the lower support each include an opening for accessing the stencil when disposed therebetween. In the closed position, the supports are secured to one another and the frame rests parallel to the base such that the stencil rests directly above the object for applying decoration. In some embodiments, an extender is removably securable to either a top side or lower side of the upper support to allow various sized objects to fit therebeneath.

15 Claims, 6 Drawing Sheets

(56) References Cited

U.S. PATENT DOCUMENTS

| | | |
|---|---|---|
| 8,661,702 B2 | 3/2014 | Ihm |
| 8,943,956 B2 | 2/2015 | Miller |
| 2017/0172181 A9 | 6/2017 | McCormick |

* cited by examiner

STENCIL HOLDER

CROSS REFERENCE TO RELATED APPLICATION

This application claims the benefit of U.S. Provisional Application No. 62/872,191 filed on Jul. 9, 2019; the above identified patent application is herein incorporated by reference in its entirety.

BACKGROUND OF THE INVENTION

The present invention relates to stencil holders. The present invention further provides a stencil holder having a base for receiving an object thereon and a frame pivotally connected to the base, wherein the frame is configured to receive a stencil that is positioned parallel to the base for rapid and consistent decoration of the object.

Many people enjoy baking and decorating cookies for personal enjoyment, to provide handmade gifts for loved ones, and more. Unfortunately, professionally decorated sweets, such as cookies, are difficult to achieve without skill and years of practice. Some people attempt to freehand decorate; however, the cookies end up looking sloppy and inconsistent. Other people choose to use tools to assist with decorating, such as stencils. However, manipulating and aligning a stencil while preventing movement of the cookie and applying stencil marks in a consistent manner is a difficult task when decorating a multitude of cookies at once.

Some devices exist that retain stencils; however, those devices lack a base that provides guidance for aligning the cookie with the stencil. When decorating multiple cookies, the prior art devices must be transferred over each cookie requiring a user to hold the frame in place or balancing the device on the cookie, which may result in damage to the cookie. Additionally, misalignment of the stencil can easily occur, particularly with non-symmetrical cookies, when transferring the device between cookies because there is no base on which to indicate to a user when the cookie is in proper alignment with the stencil. As a result, the stenciled design will be inconsistently applied. Therefore, there exists a need for a stencil holder having a frame pivotally connected to the base and configured to receive an extender to allow for various sized cookies to fit therebeneath for consistent and rapid decoration.

In light of the devices disclosed in the known art, it is submitted that the present invention substantially diverges in design elements and methods from the known art and consequently it is clear that there is a need in the art for an improvement for a stencil holder. In this regard the instant invention substantially fulfills these needs.

SUMMARY OF THE INVENTION

In view of the foregoing disadvantages inherent in the known types of stencil holders now present in the known art, the present invention provides a new stencil holder wherein the same can be utilized for rapid decoration of cookies and other objects.

It is an objective of the present invention to provide a stencil holder having a base pivotally connected to a frame, wherein the base is configured to support an object, such as cookies, for decorating. The frame includes an upper support and a lower support removably secured to one another. Fasteners are disposed on opposing faces of each support and configured to secure a stencil therebetween. The frame is movable between an open and closed position. In the open position, the supports are separable from one another such that the stencil may be inserted. In the closed position, the supports are secured to one another and the frame rests parallel to the base such that the stencil rests directly above the cookie for applying decoration.

It is another objective of the present invention to provide an extender that is removably securable to either a top side of the upper support or top side of the lower support to allow various sized cookies to fit therebeneath.

It is another objective of the present invention to provide a film pivotally connected to an upper surface of the base to secure a guide therebetween for guiding placement of the cookie.

It is therefore an object of the present invention to provide a new and improved stencil holder that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. For the purposes of presenting a brief and clear description of the present invention, the preferred embodiment will be discussed as used for decorating many cookies at once. The figures are intended for representative purposes only and should not be considered to be limiting in any respect.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment", "first embodiment", "second embodiment", or "third embodiment" does not necessarily refer to the same embodiment.

Figure 1:
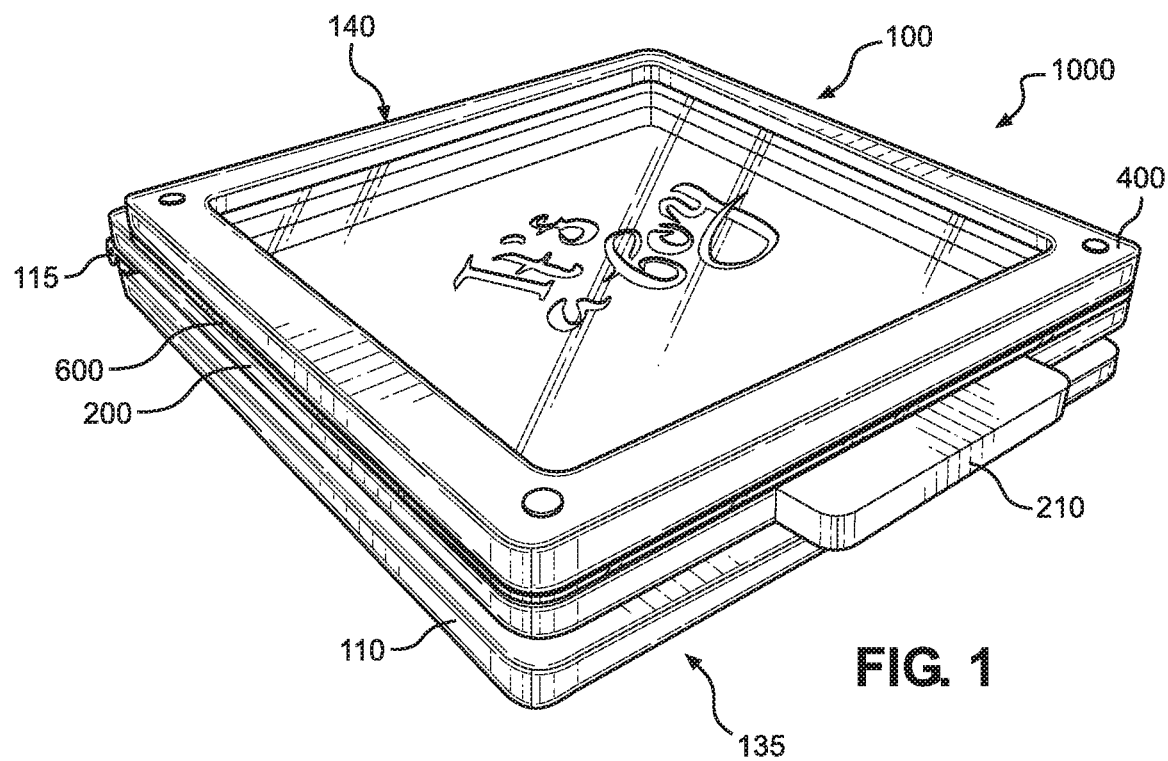
FIG. 1 shows a perspective view of an embodiment of the stencil holder, wherein the stencil is attached to the frame.
Figure 2:
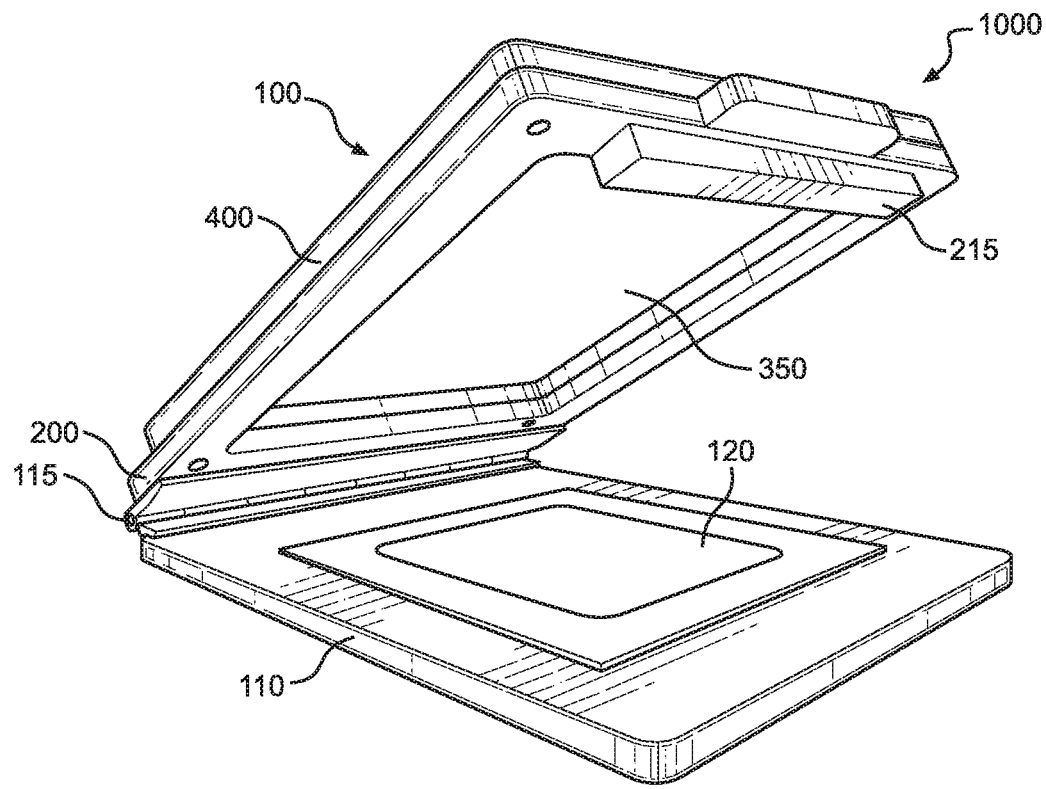
FIG. 2 shows a perspective view of an embodiment of the stencil holder in an open position.

Referring now to FIGS. 1 and 2, there are shown a perspective views of an embodiment of the stencil holder in a closed position and an open position, respectively. The stencil holder 1000 comprises a base 110 pivotally connected to a frame 100 via a pivot 115, wherein the frame 100 is configured to receive a stencil 600 for decorating objects, such as a cookie. The frame 100 secures the stencil 600 in place, so the stencil 600 remains oriented properly relative to the base 110 and any cookie placed thereon. In this way, the stencil holder 1000 allows a user to rapidly and consistently decorate cookies placed therein without causing misalignment or having to move the stencil 600.

Figure 5:
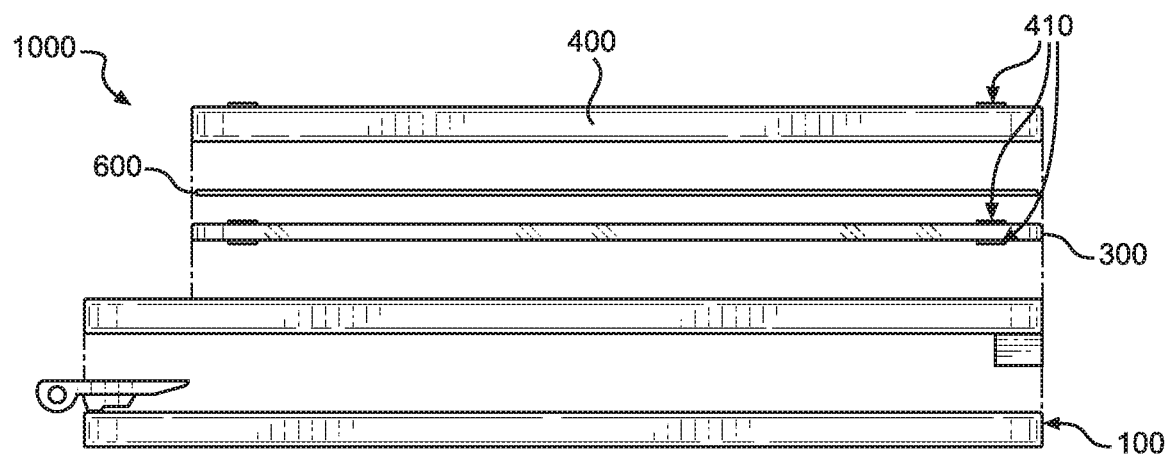
FIG. 5 shows an exploded view of an embodiment of the stencil holder, wherein the upper support and extender are separated from the frame.

In the shown embodiment, the frame 100 includes an upper support 400 removably securable to a lower support 200. The upper support 400 is separable from the lower support 200 (as seen in FIG. 5) such that the stencil 600 may be inserted and secured therebetween in an operational position. In the illustrated embodiment, the operation position is defined as when the supports 200, 400 are secured to one another and the frame 100 rests parallel to the base 110, such that the stencil 600 is configured to rest directly above the cookie for applying decoration.

In the illustrated embodiment, the supports 200, 400 comprise a quadrilateral cross section along a horizontal plane each having an opening 350 for accessing the stencil 600 when in use. In the illustrated embodiment, the opening 350 of each support extends the majority of the width and length thereof, such that the remaining surface area of each support 200, 400 is minimal and used for securing the stencil 600. The opening 350 of the upper support 400 is aligned above the opening 350 of the lower support 200 when coupled together. When the lower and upper support 200, 400 are coupled via one or more fasteners, the supports 200, 400 are stacked such that the openings 350 are coaxial. In the illustrated embodiment, the cross section of the upper and lower supports 200, 400 correspond to the shape of the base 110. However, in alternate embodiments, the supports 200, 400 comprise any suitable shape so long as the perimeter of the upper support 400 secures to the perimeter of the lower support 200 for sandwiching a stencil therebetween. In this way, the frame is configured to receive stencils having different cross-sectional shapes, such as rectangular and circular. In the illustrated embodiment, the base and the frame are composed of a transparent material.

In the illustrated embodiment, the lower support 200 comprises a same width as the upper support 400 but a larger depth, wherein the width is measured between the lateral sides and the depth is measured between a front 135 and rear side 140 of the stencil holder 1000. The lower support 200 is deeper than the upper support 400 in order to correspond to the depth and width of the base 110. As a result of the difference in depth, a ledge is created at the rear side 140 of the stencil holder 1000, along the frame (seen in FIG. 3, 130). The ledge provides hand and/or finger placement to a user when separating the upper support 400 from the lower support 200, via a sliding motion. In the illustrated embodiment, the exterior perimeter of the upper support does not extend past the exterior perimeter of the lower support.

In the illustrated embodiment, the lower support 200 is pivotally connected to the base 110 via the pivot 115. In alternate embodiments, the lower support 200 is removably secured to the base 110 (as seen in FIG. 5). In some embodiments, the upper support 400 maintains the pivotal connection to the base 110 and the lower support 200 is removably secured thereto. In some embodiments, both supports 200, 400 are pivotally connected to the base 110 or to one another. In the illustrated embodiment, the pivot 115 extends entirely across the rear side 140 of the stencil holder 1000.

In the illustrated embodiment, the base 110 comprises a flat upper side adapted to support the object thereon, such that the object is positioned within a boundary of the opening of the lower support. The base 110, is configured to rest on a flat surface, such as a table. In the illustrated embodiment, the base 110 comprises the same cross section as the frame, however, in alternate embodiments the base 110 comprises any suitable shape and can include a shape incongruent with the frame. In some embodiments, the base comprises a cutout or recess adapted to align with the opening of the lower frame in the operational position and configured to receive the object thereon. The cutout or recess provide additional securement of the object to prevent any movement when decorating.

In the illustrated embodiment, the stencil holder 1000 comprises a spacer 215 extending from the lower support 200 of the frame, opposite the pivot 115, for creating a gap (FIG. 3, 150) between the base 110 and the frame. The spacer 215 is configured to maintain the lower support 200 and base 110 in a parallel position relative to one another, wherein the gap is adapted to receive the cookie when the stencil holder 1000 is in use. In the illustrated embodiment, the spacer 215 is a unitary protrusion comprising a rectangular cross section and extending between the lateral sides of the stencil holder 1000. In alternate embodiments, the spacer 215 comprises more than one protrusion disposed at fixed intervals between the lower support 200 and the base 110. In some embodiments, the spacer 215 extends directly from the base and serves as a shelf to the lower support 200. In other embodiments, the spacer 215 extends from opposing lateral sides of the lower support 200.

Figure 8:
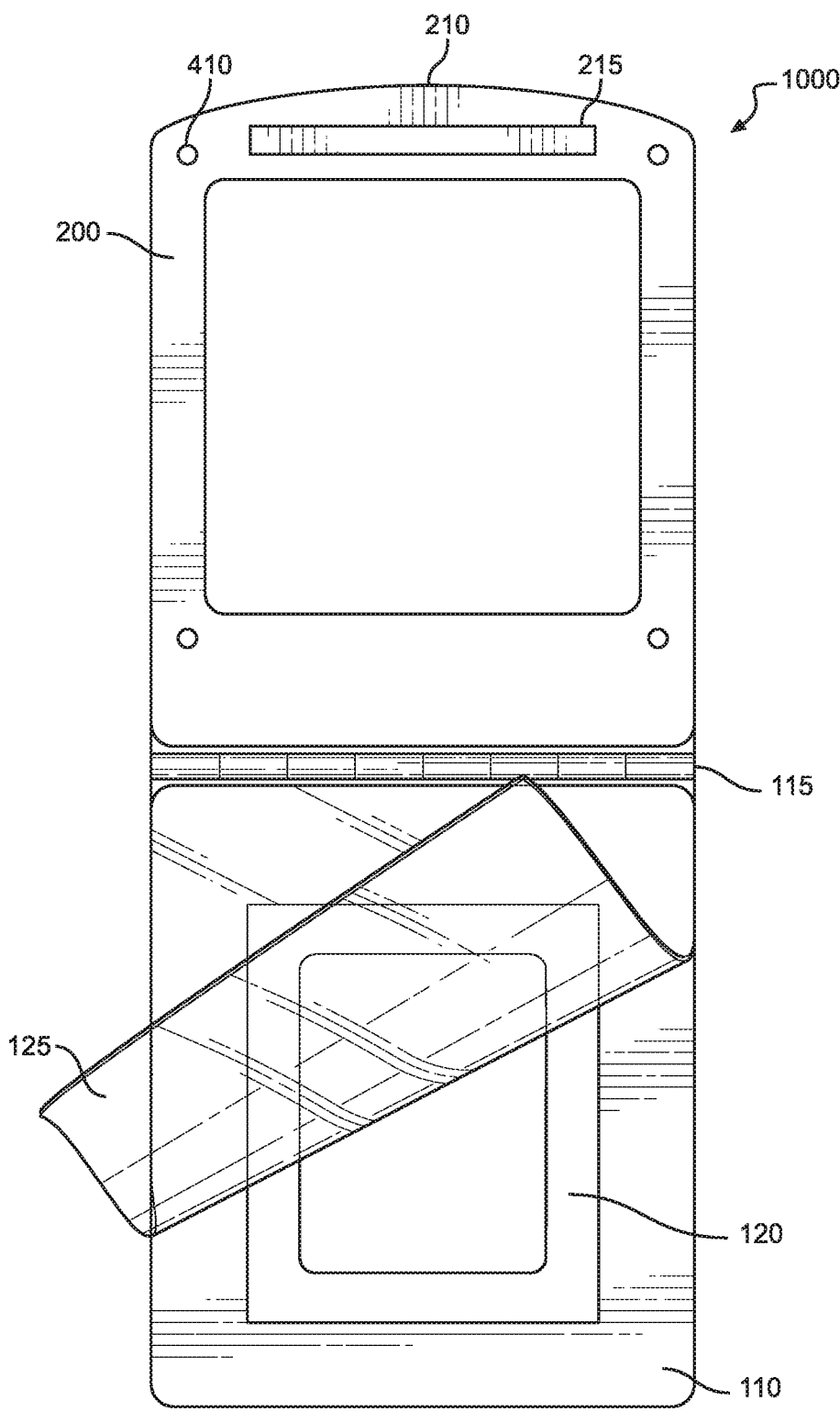
FIG. 8 shows a top down view of an embodiment of the stencil holder in an open position, wherein the film is in a lifted position.

In the illustrated embodiment, the stencil holder 1000 further includes a handle 210 extending from the fronts side thereof. The handle 210 assists a user in moving the frame between a closed and open position. The handle 210 protrudes outward from the lower support 200 on a same plane thereof. In some embodiments, the handle 210 comprises a rectangular cross section, whereas in other embodiments the handle 210 comprises a continuous curve extending entirely from a first lateral side of the lower support 200 to an opposing second lateral side of the lower support 200 (as seen in FIG. 8, 210).

Figure 3:
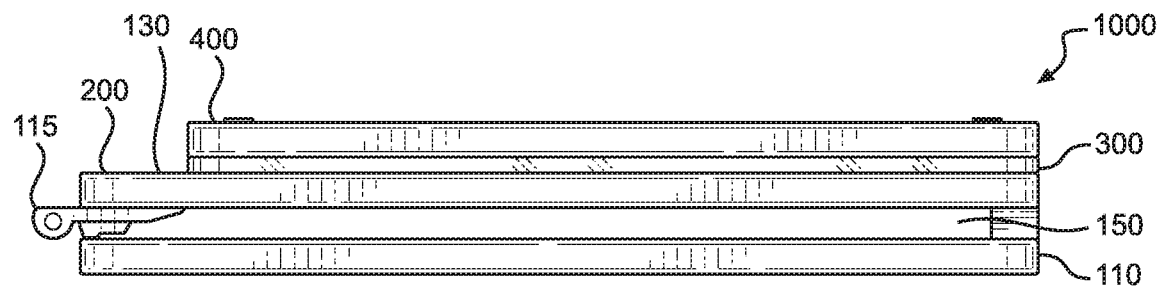
FIG. 3 shows a side perspective view of an embodiment of the stencil holder, wherein the extender is attached to the frame.
Figure 4:
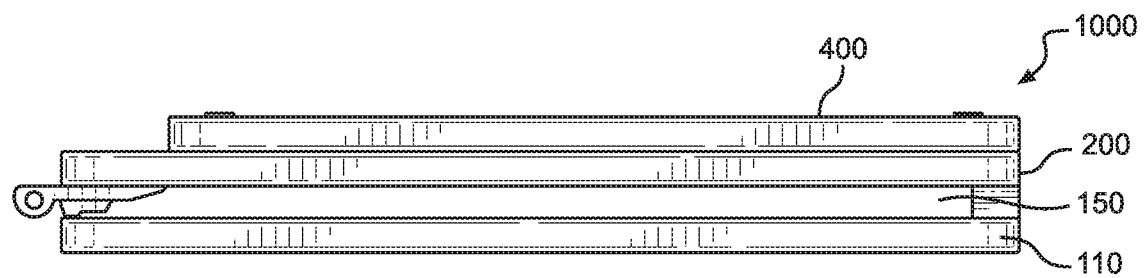
FIG. 4 shows a side perspective view of an embodiment of the stencil holder in a closed position.

Referring now to FIGS. 3-5, there are shown side perspective views of an embodiment of the stencil holder and an exploded view of an embodiment of the stencil holder, respectively. In the illustrated embodiment, the upper and lower supports 200, 400 are removably connected to one another via fasteners 410 disposed on opposing faces of each support 200, 400. The fasteners are adapted to removably couple the lower support and the upper support to align the openings of the upper support and the lower support. In the illustrated embodiment, the upper support 400 and lower support 200 are similar in dimension, wherein the opening extends over a central portion of the base, wherein the openings provide access to an object placed on the base.

In the illustrated embodiment, the fasteners 410 are magnetic and disposed on each corner of the supports 200, 400. In the illustrated embodiment, the fasteners 410 are embedded within the perimeter of the supports 200, 400. In this way, the fasteners 410 do not increase the overall thickness of the frame or corresponding supports 200, 400. In alternate embodiments, the fasteners are any suitable fasteners configured to removably secure to the supports to one another. Further, the frame is configured to secure the stencil 600 between each support via the fasteners 410. In this way, a user can interchange the stencil 600 within the frame for decorating cookies with various designs.

In some embodiments, the stencil holder 1000 comprises an extender 300 that is removably securable to either a top side or lower side of the upper support 400 to allow various sized cookies to fit therebeneath. In the illustrated embodiment, the extender 300 is similar in shape and size to the upper support 400 such that more space is provided between the uppermost surface of the frame and base 110. In this way, the stencil holder 1000 is adjustable to receive cookies having various thicknesses. The extender 300 is visible in FIGS. 1 and 3. In some embodiments, the thickness of the extender 300 is between ⅛ inch to ¼ inch. In the illustrated embodiment, the extender 300 comprises the same type and positioning of fasteners 410 as the lower and upper supports 200, 400.

In use, the stencil 600 is secured between the opposing faces of the supports 00, 200. In some embodiments, the stencil holder 1000 comprises the stencil. The stencil 600 is translucent or transparent in order to allow a user to view the guide disposed on the base. In some embodiments, the stencil 600 comprises an indicator, such as a bright color, in order to alert a user of the presence of the stencil when secured to the frame. In one embodiment, the stencil 600 includes a pattern cut therethrough, that provides for the application of a decorating material to the received object resting atop the base 110. In this way, the stencil 600 is cooperatively held by the frame such that the pattern is exposed over the open area. The frame may be selectively lifted away from the base 110 to interchange the object, such as a cookie, without requiring repositioned of the stencil 600 relative to the frame.

Figure 6:
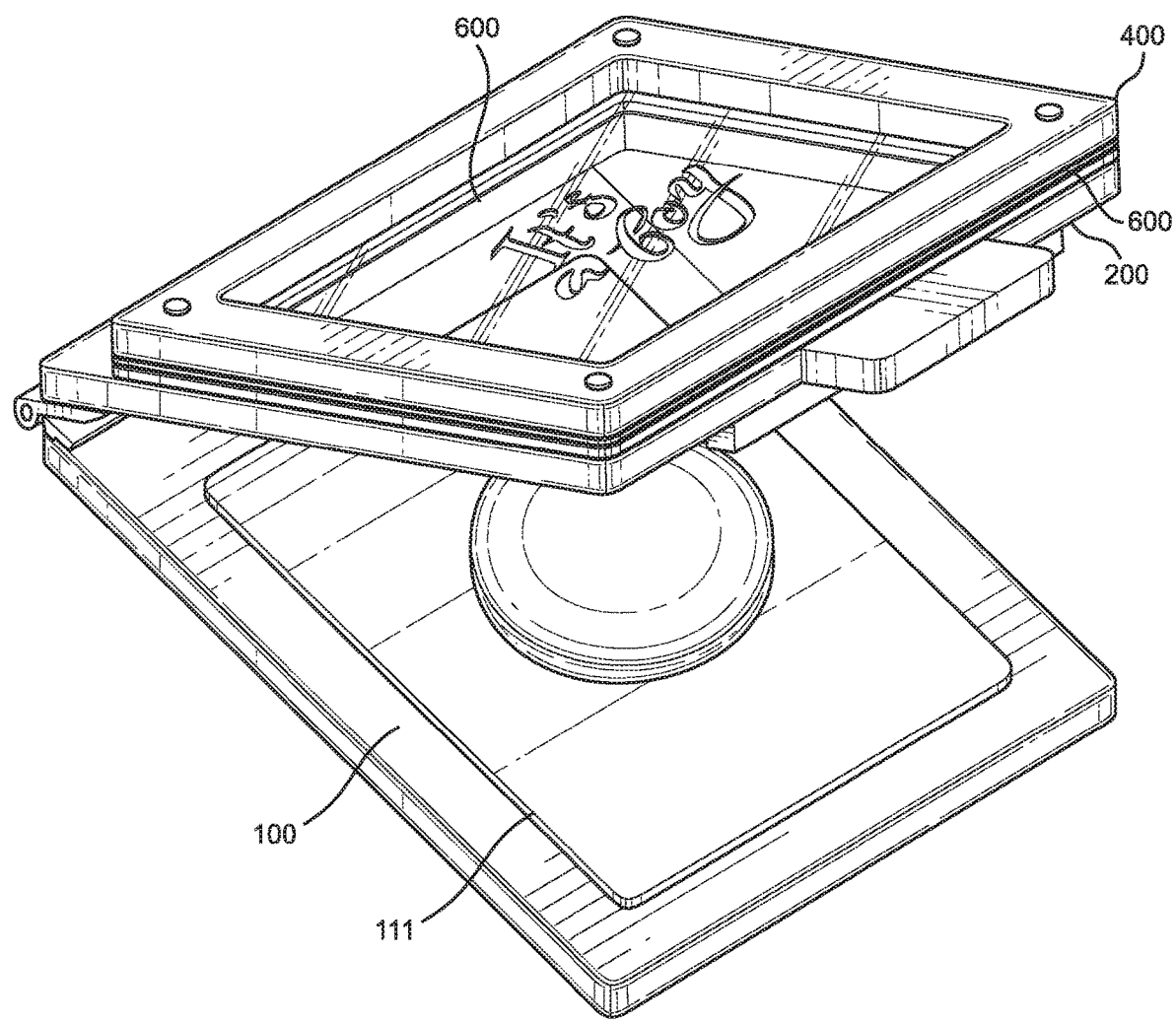
FIG. 6 shows an alternate perspective view of an embodiment of the stencil holder, wherein a lifter is disposed on the base.

Referring now to FIG. 6, there is shown an alternate perspective view of an embodiment of the stencil holder, wherein a lifter is disposed on the base. In some embodiments, the stencil holder comprises a lifter 111 removably disposed on an upper surface of the base 110. The lifter 111 is a raised plateau that allows for raising a thinner cookie from the base 110, closer towards the frame such that the upper surface of the cookie contacts the stencil. In the illustrated embodiment, the lifter 111 comprises a same cross-sectional shape as the base 110 but has a smaller width and depth. The lifter is transparent to allow the surface of the base 110 to be visible. In the illustrated embodiment, the lifter 111 comprises a thickness of ⅛ inch to ¼ inch. In some embodiments, the lifter 111 is removably securable to the base 110 via a quick release fastener, such as adhesive.

Figure 7:
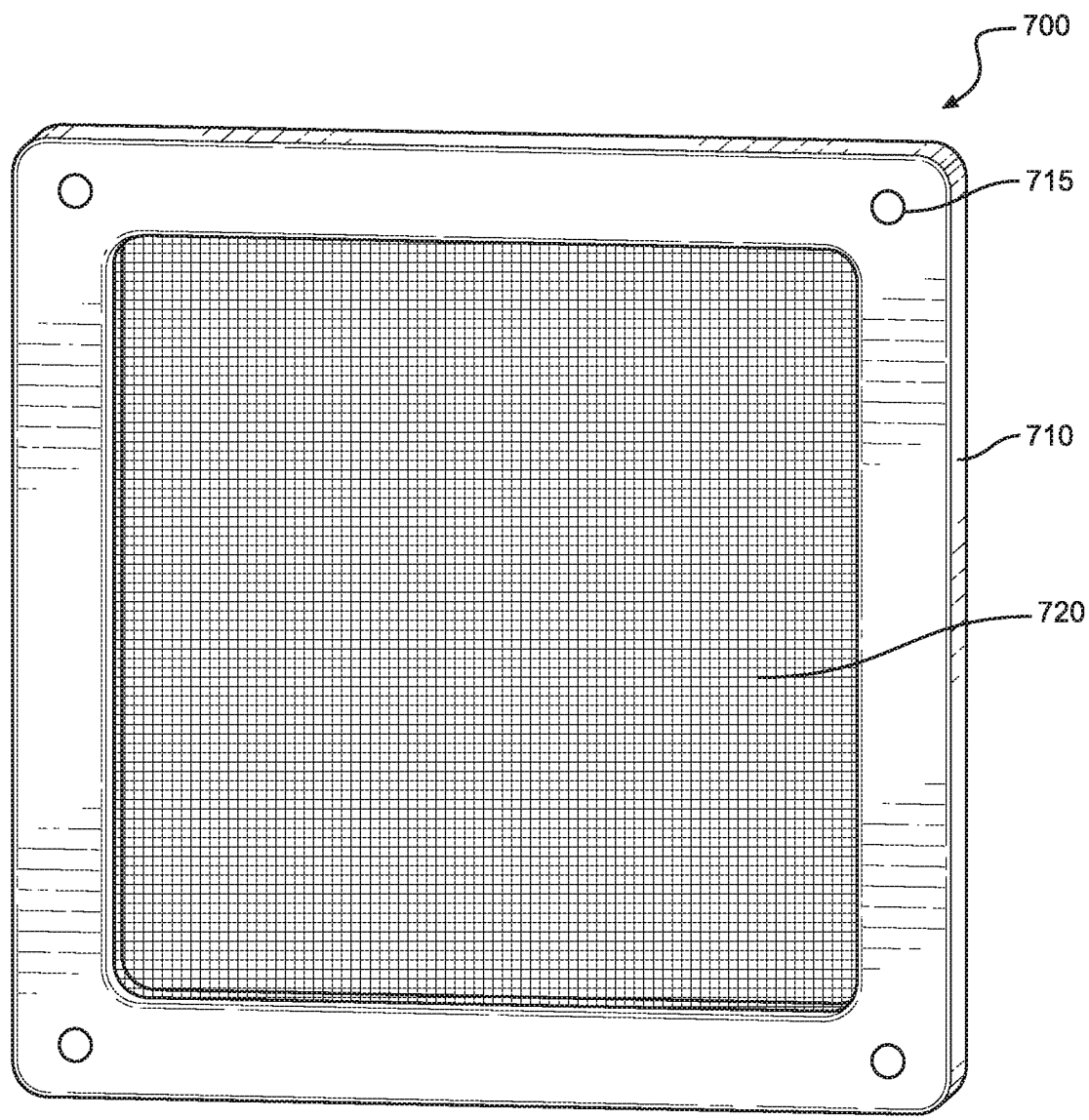
FIG. 7 shows a perspective view of a screen of an embodiment of the stencil holder.

Referring now to FIG. 7, there is shown a perspective view of a screen of an embodiment of the stencil holder. In some embodiments, the stencil holder comprises a screen 700 that is removably securable to the frame. In this way, certain decorating techniques, such as air brushing, can be accomplished without the unnecessary accumulation of paint and mess. The screen 700 comprises a screen frame 710 and a silk screen 720 disposed therein. The screen frame 710 comprises a shape and size similar to the extender or upper support and attaches to the frame via similar fasteners 715. The screen 700 is configured to entirely cover the stencil openings. In use, the screen 700 is adapted to be removably secured to the upper support, above the stencil to prevent overspray or under-spray providing the user with more control of the medium. Alternatively, the screen 700 is adapted to replace the upper support, such that the stencil can be positioned directly to the silk screen 720 or be disposed between the lower support and the silk screen frame 710.

Referring now to FIG. 8, there is shown a top down view of an embodiment of the stencil holder in an open position. In the illustrated embodiment, a film 125 is disposed over the base 110 and is pivotally connected either to the base 110 or to the pivot 115. The film 125 is transparent and configured to secure a guide 120 between the film 115 and the base 110. In the illustrated embodiment, the guide 120 serves as an indicator where to place the object upon the base 110 to achieve consistent stencil marks on each object when decorating. This is beneficial because the stencil must be aligned with the object in a particular manner for achieving a consistent design from object to object, especially if the object is irregular in shape or non-circular. In some embodiments, the film 125 is adhered to the upper surface of the base 110.

Figure 9:
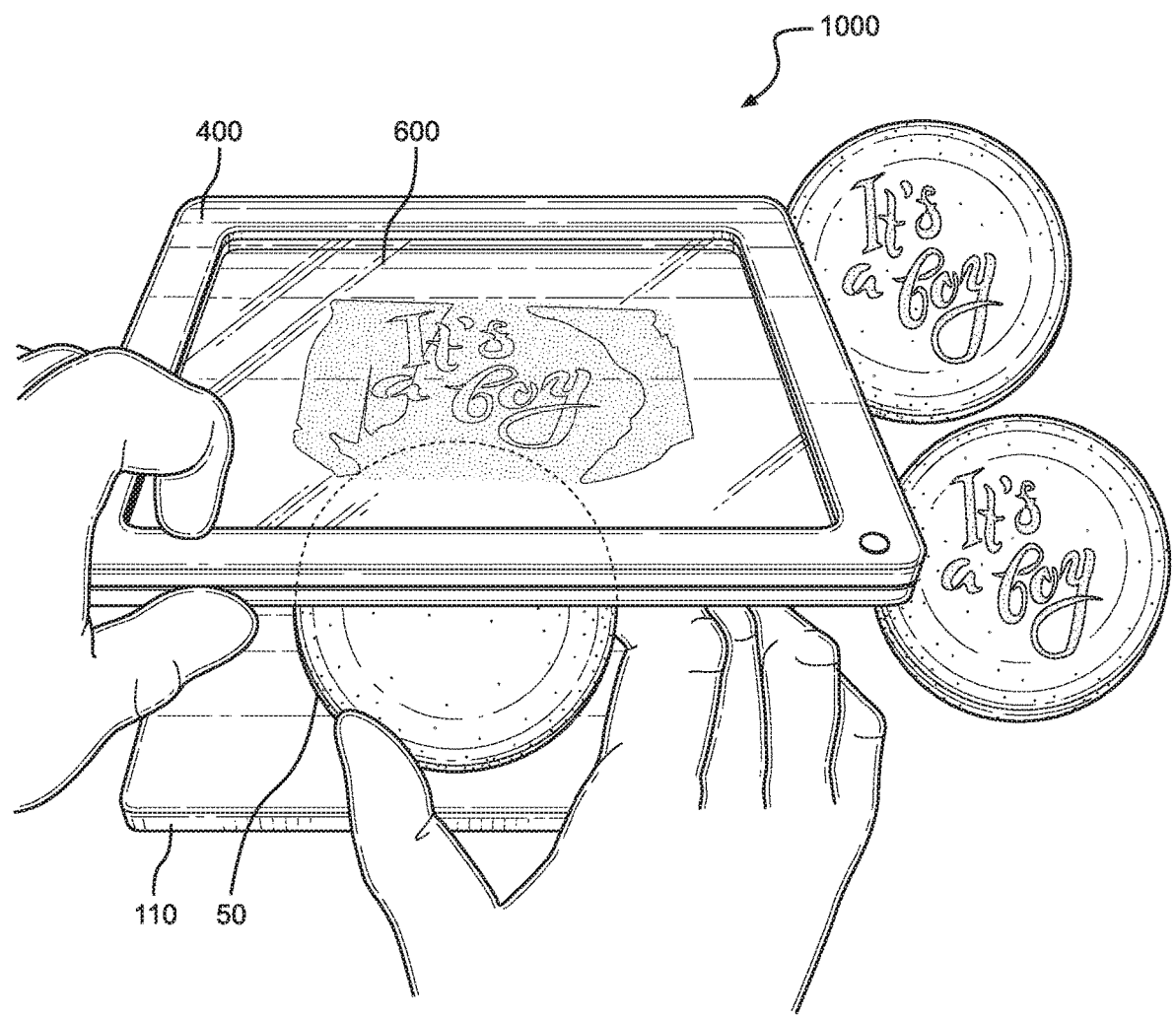
FIG. 9 shows a perspective view of an embodiment of the stencil holder in use.

Referring now to FIG. 9, there is shown a perspective view of an embodiment of the stencil holder in use. In operation, the upper support 400 is separated from the lower support 200 and a stencil 600 is inserted therebetween. The upper support 400 is then secured to the lower support 200. The guide is positioned between the film and the base 110 in order to allow the same positioning of a cookie 50 when decorating, such that the cookie 50 aligns consistently with the stencil 600 to be used. Once the cookie 50 is in position atop the base 110, the frame is lowered parallel to the base such that the stencil 600 is contacting the portion of the cookie 50 to be decorated. A user applies the decoration via the stencil 600, lifts the frame and replaces the decorated cookie with an undecorated cookie. The steps are repeated until all the cookies have been consistently decorated with the same stencil. In this way, the cookies are consistently and rapidly decorated.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stencil holder for decorating an object, comprising:
   a base pivotally connected to a frame via a pivot, wherein the frame is adapted to move between a closed position and an open position;
   the frame comprising a lower support pivotally secured to the base and adapted to removably couple with an upper support, wherein the upper support and the lower support cooperatively secure a stencil therebetween in an operational position;

wherein the upper support and the lower support each comprise an opening for accessing the stencil when disposed therebetween;

a fastener adapted to removably couple the lower support and the upper support to align the openings of the upper support and the lower support;

a spacer extending from the lower support opposite to the pivot and disposed between the base and the lower support causing the lower support to remain parallel to the base when the stencil holder is in the closed position, wherein the spacer moves with frame when transitioning between the open and closed positions;

wherein the lower support comprises a depth greater than a depth of the upper support forming a ledge on a rear side of the frame, wherein the depth is measured between the pivot of the frame and an opposing free end of the frame, the ledge configured to serve as a hand-hold when separating the upper support from the lower support;

a film connected to the base and configured to cover an upper side of the base, wherein the film and the base are adapted to secure a guide therebetween, wherein the guide provides indicia for placement of the object thereon.

2. The stencil holder of claim 1, wherein the upper support is coextensive with the lower support in the operational position such that the stencil extends across the openings of the upper support and the lower support.

3. The stencil holder of claim 1, wherein an exterior perimeter of the upper support does not extend past an exterior perimeter of the lower support.

4. The stencil holder of claim 1, further comprising a handle extending outward from a front side of the lower support, wherein the handle is opposite the pivot and adapted to move the frame between the closed position and the open position.

5. The stencil holder of claim 1, wherein the pivot extends entirely across a rear side of the stencil holder.

6. The stencil holder of claim 1, wherein the base comprises a flat upper side adapted to support the object thereon, such that the object is positioned within a boundary of the opening of the lower support.

7. The stencil holder of claim 1, wherein the base comprises a lifter on an upper side thereof, wherein the lifter is raised relative to the surrounding upper side, wherein the lifter is adapted to position the object placed thereon within a boundary of the opening of the lower support.

8. The stencil holder of claim 1, wherein the upper support and the lower support each comprise a quadrilateral shape having the fasteners disposed at each corner thereof.

9. The stencil holder of claim 8, wherein the fasteners are embedded within the upper support and the lower support, respectively, such that opposing faces of the upper support and the lower support rest flush against the stencil in the operational position.

10. The stencil holder of claim 1, further comprising a screen having a screen frame and a silk screen within the screen frame, wherein the screen frame comprises a same width and depth as the upper support and is removably securable thereto.

11. The stencil holder of claim 1, further comprising an extender removably securable to the lower support or the upper support, wherein the extender comprises an open area and a same width and depth as the upper support.

12. The stencil holder of claim 1, wherein the ledge extends an entire width of the rear side of the frame.

13. The stencil holder of claim 1, wherein the base and the frame are composed of transparent material.

14. A method of securing a stencil in a stencil holder, the method comprising:

providing the stencil holder having:
a base pivotally connected to a frame via a pivot, wherein the frame is adapted to move between a closed position and an open position;

the frame comprising a lower support pivotally secured to the base and adapted to removably couple with an upper support, wherein the upper support and the lower support are adapted to cooperatively secure a stencil therebetween in an operational position;

wherein the upper support and the lower support each comprise an opening for accessing the stencil when disposed therebetween;

a fastener adapted to removably couple the lower support and the upper support to align the openings of the upper support and the lower support;

a spacer extending from the lower support opposite to the pivot and disposed between the base and the lower support causing the lower support to remain parallel to the base when the stencil holder is in the closed position, wherein the spacer moves with frame when transitioning between the open and closed positions;

wherein the lower support comprises a depth greater than a depth of the upper support forming a ledge on a rear side of the frame, wherein the depth is measured between the pivot of the frame and an opposing free end of the frame, the ledge configured to serve as a hand-hold when separating the upper support from the lower support;

a film connected to the base and configured to cover an upper side of the base, wherein the film and the base are adapted to secure a guide therebetween, wherein the guide provides indicia for placement of the object thereon;

lifting the frame away from the base to the open position;
placing an object on the base within the opening;
moving the frame to the closed position, such that the lower support is parallel to the base;
placing the stencil between the lower support and the upper support;
securing the lower support to the upper support.

15. The method of securing a stencil in a stencil holder of claim 14, further comprising applying ink to the object through the stencil.

* * * * *